(12) United States Patent
Hohmann

(10) Patent No.: US 10,149,442 B2
(45) Date of Patent: Dec. 11, 2018

(54) AUTOMATED PLANTER APPARATUS

(71) Applicant: Thomas Luke Hohmann, Cumming, GA (US)

(72) Inventor: Thomas Luke Hohmann, Cumming, GA (US)

( * ) Notice: Subject to any disclaimer, the term of this patent is extended or adjusted under 35 U.S.C. 154(b) by 182 days.

(21) Appl. No.: 15/205,568

(22) Filed: Jul. 8, 2016

(65) Prior Publication Data

US 2018/0007848 A1    Jan. 11, 2018

(51) Int. Cl.
*A01G 27/00*    (2006.01)
*A01G 27/02*    (2006.01)

(52) U.S. Cl.
CPC ........... *A01G 27/02* (2013.01); *A01G 27/003* (2013.01); *A01G 27/005* (2013.01); *A01G 27/008* (2013.01)

(58) Field of Classification Search
CPC .......... A01G 27/02; A01G 27/06; A01G 9/02; A01G 27/00; A01G 27/003; A01G 27/005; A01G 27/008; A01G 9/028
USPC .................................... 47/65.5, 66.6, 79, 87
See application file for complete search history.

(56) References Cited

U.S. PATENT DOCUMENTS

| | | | |
|---|---|---|---|
| 4,991,345 A * | 2/1991 | Bloch | A01G 27/00 47/65.5 |
| 5,598,662 A | 2/1997 | Droste | |
| 5,749,170 A * | 5/1998 | Furuta | A01G 27/003 47/48.5 |
| 5,752,341 A | 5/1998 | Goldfarb | |
| 6,038,813 A * | 3/2000 | Moore | A01G 9/029 47/75 |
| 6,345,470 B1 * | 2/2002 | Slaght | A01G 27/02 47/79 |
| 7,730,665 B2 | 6/2010 | Tran | |
| 7,832,146 B2 | 11/2010 | Gordon | |
| 8,291,639 B2 * | 10/2012 | Gardner | A01G 9/16 47/60 |
| 8,544,496 B2 | 10/2013 | Gilpatrick | |
| 9,113,606 B2 * | 8/2015 | Gardner | A01G 31/00 |
| 9,241,452 B2 | 1/2016 | Stewart | |
| 2006/0260187 A1 * | 11/2006 | Feketa | A01G 27/001 47/48.5 |

(Continued)

FOREIGN PATENT DOCUMENTS

CA    2444113 A1 *    3/2005    ........... A01G 27/003

*Primary Examiner* — Peter M Poon
*Assistant Examiner* — Danielle A Clerkley
(74) *Attorney, Agent, or Firm* — PatentFile, LLC; Bradley C. Fach; Steven R. Kick

(57) ABSTRACT

In some embodiments, an automated planter apparatus may include a reservoir container having a base with a sidewall coupled to and extending away from the base. A reservoir cavity may be disposed within the reservoir container and may be formed and bounded by the sidewall and base. A support lid may be configured to extend over and cover all or portions of the reservoir cavity. One or more receptacles may be disposed within the support lid, and each receptacle may be in fluid communication with the reservoir cavity. One or more pumps may be in fluid communication with the reservoir cavity and each receptacle. A plant container may be removably coupled within a receptacle. A processing unit may be in electrical communication with each pump and be configured to activate and control each pump.

8 Claims, 12 Drawing Sheets

(56) References Cited

U.S. PATENT DOCUMENTS

| | | | | |
|---|---|---|---|---|
| 2008/0282610 A1* | 11/2008 | Bissonnette | ........... | A01G 7/045 47/64 |
| 2009/0056219 A1* | 3/2009 | Csoke | ................... | A01G 27/02 47/79 |
| 2009/0293354 A1* | 12/2009 | Goldberg | ............. | A01G 25/167 47/66.6 |
| 2010/0064581 A1* | 3/2010 | Johnson | ............... | A01G 25/167 47/79 |
| 2012/0047801 A1* | 3/2012 | Hogan | ................... | A01G 9/022 47/66.6 |
| 2013/0074408 A1* | 3/2013 | Singh | ..................... | A01G 31/02 47/62 E |
| 2013/0305603 A1* | 11/2013 | Azoulay | ............. | A01G 31/02 47/60 |
| 2015/0033625 A1* | 2/2015 | Jawarski | ................ | A01G 27/02 47/79 |
| 2015/0237814 A1* | 8/2015 | Moran | ................ | A01G 27/003 47/66.7 |

* cited by examiner

AUTOMATED PLANTER APPARATUS

FIELD OF THE INVENTION

This patent specification relates to the field of self watering devices. More specifically, this patent specification relates to an apparatus for housing and autonomously watering plants.

BACKGROUND OF THE INVENTION

Aside from not enough sunlight, the most common reason for low fruit, vegetable, and plant yields is sub optimal watering of the plants. This means that the soil is either too wet or too dry. When plants are housed in above ground containers, the plants require frequent watering or else they will quickly wither and die since such containers hold a relatively small volume of soil and therefore suffer rapid loss of moisture through evaporation. Moreover, planter boxes are frequently located under eaves, deck coverings, trees or other features that obstruct or limit their access to rain water. Furthermore, these containers may be located under eaves, deck coverings, trees, or other objects that may obstruct or limit their access to rain water. The need for frequent and routine watering places a significant burden on the homeowner or gardener to maintain a soil environment that is not too dry and not too moist.

In order to address these watering needs, some watering devices have been developed which incorporate a simple appliance timer such as "self watering" plastic garden systems. These gardens system basically have a low cost appliance timer attached to an electrical motor that runs for a period of time every day, whether the plants need water or not. Additionally some non-electric or mechanical devices exist that rely on structures or materials having physical characteristics that respond in some way to changes in moisture, however, these devices tend to exhibit poor reliability and long-term durability.

Therefore, a need exists for a novel apparatus for housing and autonomously watering plants. There is a further need for a novel apparatus for housing and autonomously watering plants which is able to prevent plants in above ground containers which hold a relatively small volume of soil from withering and dying from a lack of adequate soil moisture. Finally, there exists a need for a novel apparatus for housing and autonomously watering plants that enables a homeowner or gardener to maintain a soil environment that is not too dry or too moist.

BRIEF SUMMARY OF THE INVENTION

A new automated planter apparatus is described by example herein. The apparatus may be configured to house and autonomously water plants which may be multicellular eukaryotes of the kingdom Plantae. In some embodiments, the apparatus may include a reservoir container having a base with a sidewall coupled to and extending away from the base. A reservoir cavity may be disposed within the reservoir container and may be formed and bounded by the sidewall and base. A support lid may be configured to extend over and cover all or portions of the reservoir cavity. One or more receptacles may be disposed within the support lid, and each receptacle may be in fluid communication with the reservoir cavity. A pump may be in fluid communication with the reservoir cavity and one or more receptacles. A processing unit may be in electrical communication with the pump and be configured to activate and control the pump.

In further embodiments, the apparatus may include a moisture sensor and the processing unit may be in electrical communication with the moisture sensor and the pump. A moisture sensor may be configured to measure the moisture level of soil in one or more receptacles and/or plant containers. The processing unit may activate the pump when the moisture sensor detects moisture below a moisture threshold.

In further embodiments, the apparatus may include one or more plant containers and each plant container may be removably coupled within a receptacle. The plant containers may have a chamber which may include one or more water apertures, and the water apertures may provide fluid communication between the chamber and a receptacle.

In further embodiments, the apparatus may comprise two or more pumps and each pump may be in fluid communication with the reservoir cavity and one or more receptacles. The apparatus may also include two or more moisture sensors and the processing unit may be in electrical communication with the moisture sensors and the pumps. Each moisture sensor may be configured to measure the moisture level of soil in one or more receptacles and/or plant containers. The processing unit may activate one or more pumps when one or more moisture sensors detects moisture in one or more receptacles and/or plant containers to be below a moisture threshold.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
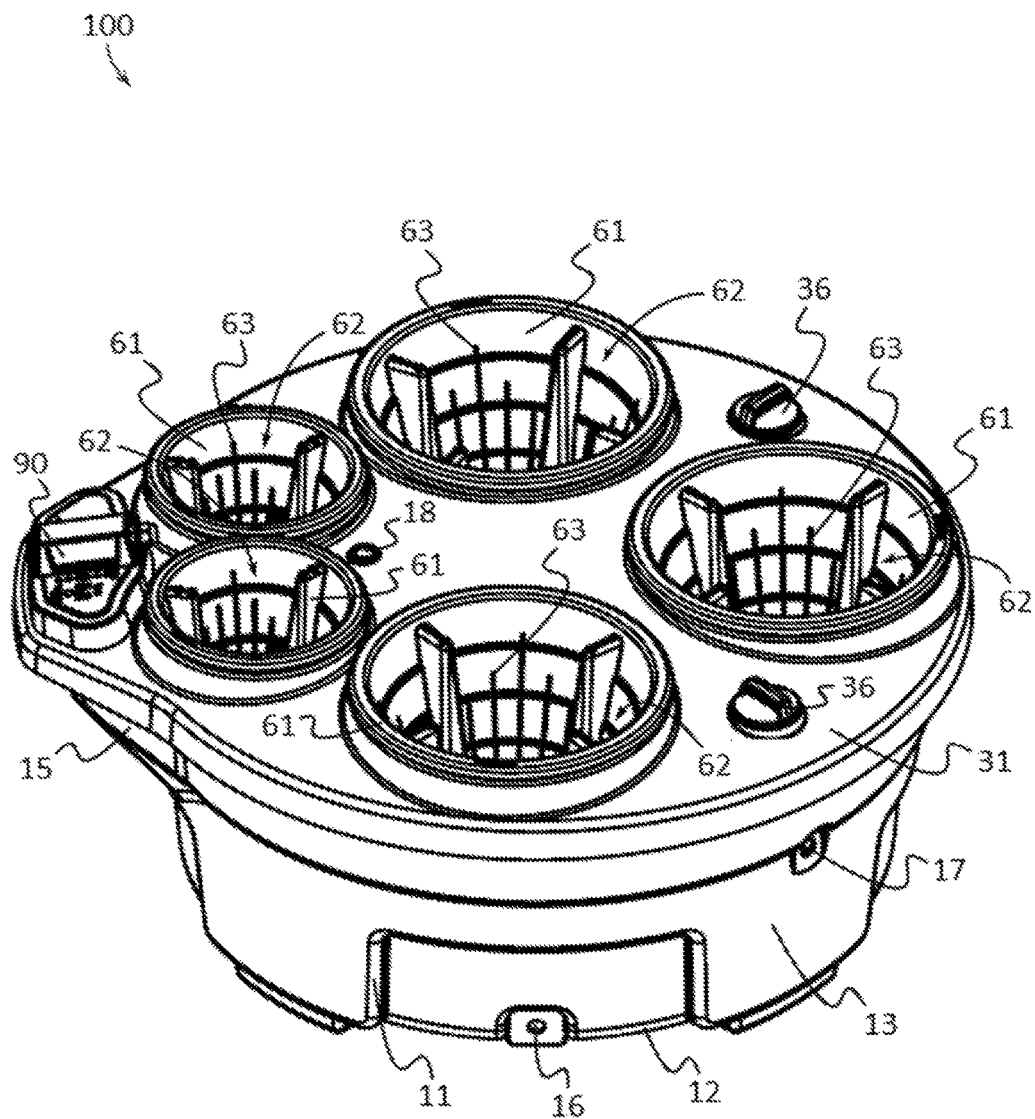
FIG. 1 depicts a top perspective view of an example of an automated planter apparatus according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

A new apparatus for housing and autonomously watering plants is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 2:
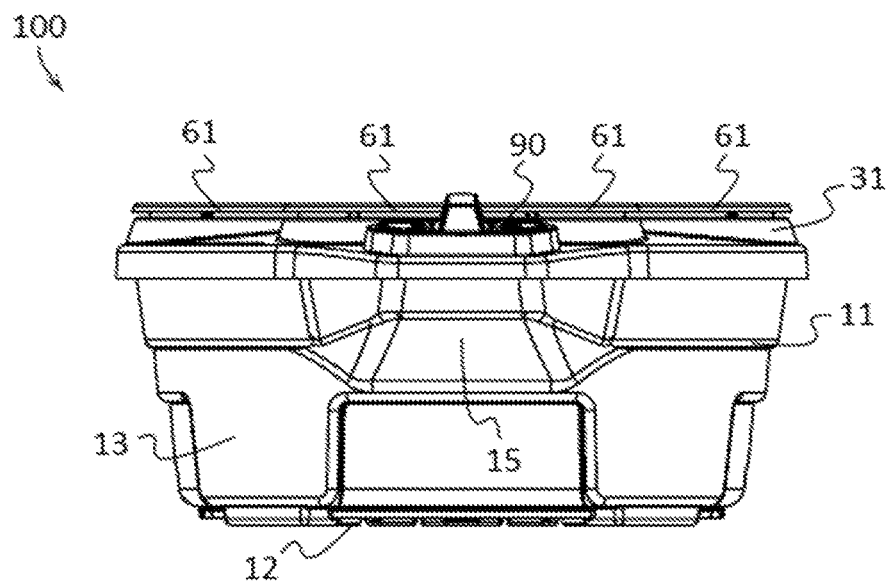
FIG. 2 illustrates a front elevation view of an example of an automated planter apparatus according to various embodiments described herein.
Figure 3:
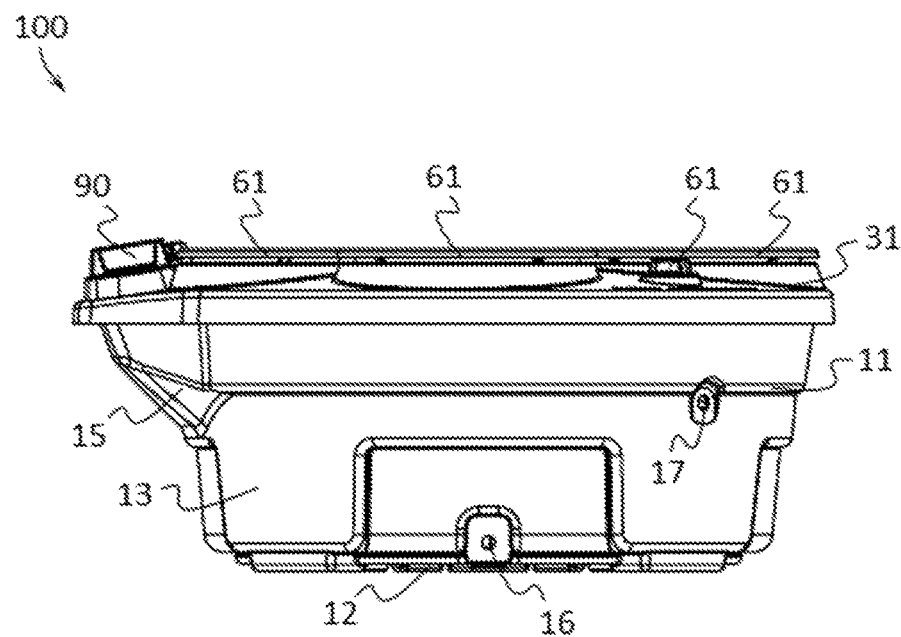
FIG. 3 shows a side elevation view of an example of an automated planter apparatus according to various embodiments described herein.
Figure 4:
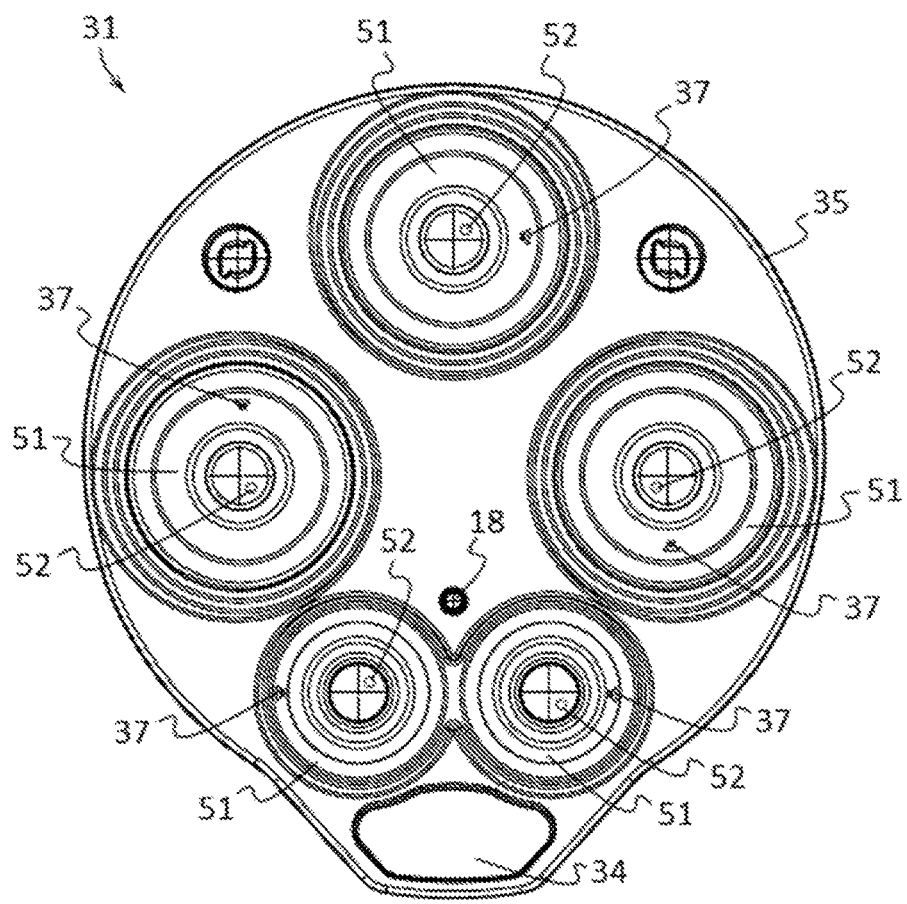
FIG. 4 depicts a top plan view of an example of a support lid according to various embodiments described herein.
Figure 5:
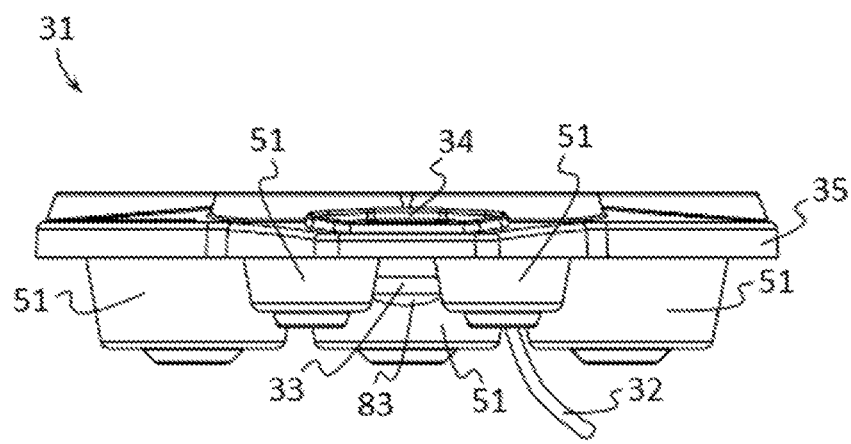
FIG. 5 illustrates a front elevation view of an example of a support lid according to various embodiments described herein.

The present invention will now be described by example and through referencing the appended figures representing preferred and alternative embodiments. FIGS. 1-3 depict examples of an automated planter apparatus ("the apparatus") 100 which may be configured to house and autonomously water plants according to various embodiments described herein. The apparatus may accept plants, also called green plants, which may be multicellular eukaryotes of the kingdom Plantae. They form an unranked clade Viridiplantae (Latin for green plants) that includes the flowering plants, conifers and other gymnosperms, ferns, clubmosses, hornworts, liverworts, mosses and the green algae.

Figure 6:
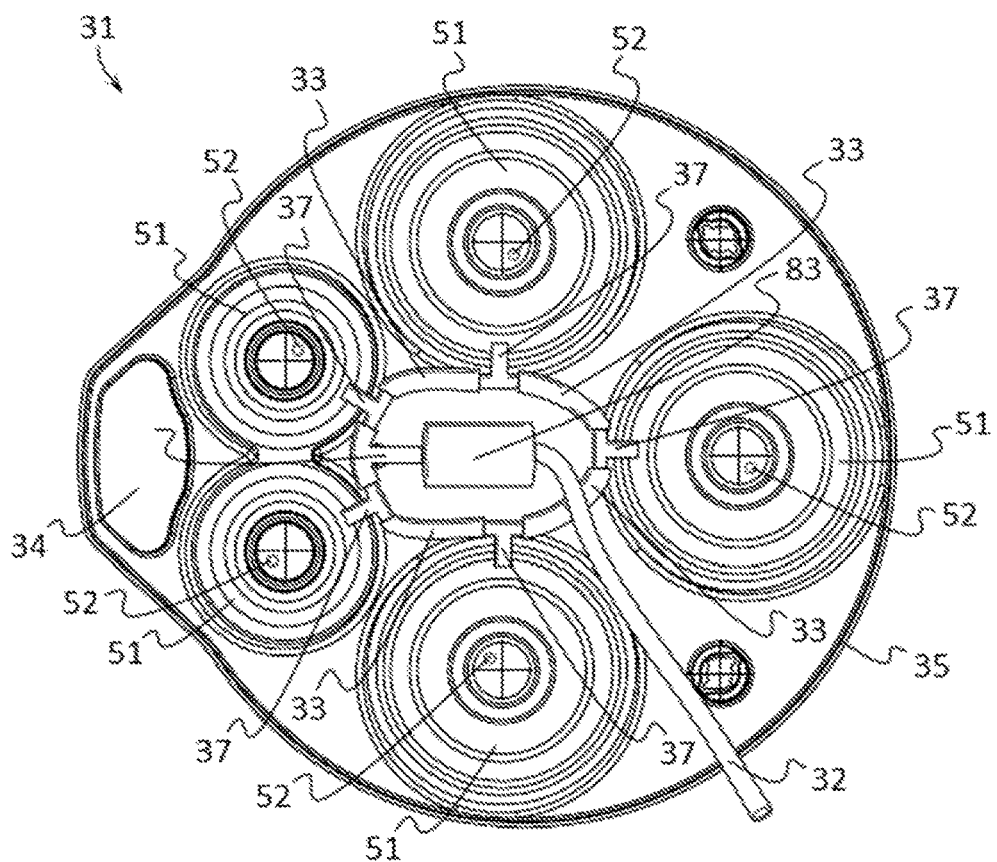
FIG. 6 shows a bottom plan view of an example of a support lid according to various embodiments described herein.
Figure 7:
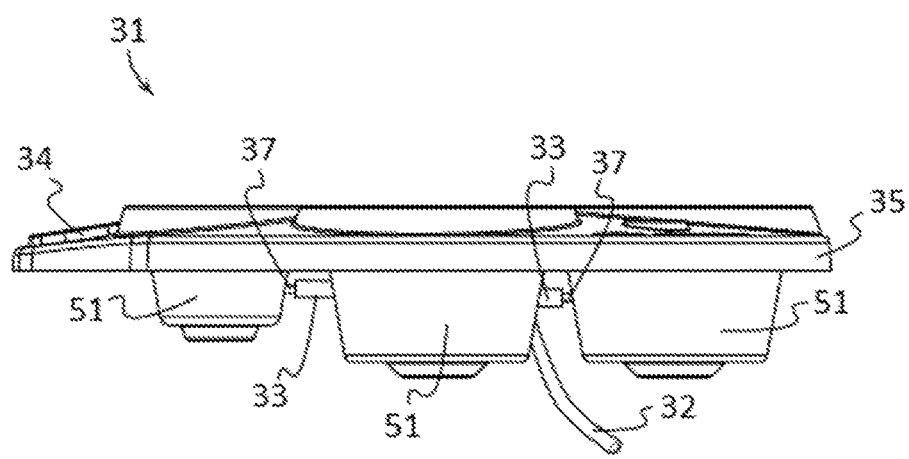
FIG. 7 depicts a side elevation view of an example of a support lid according to various embodiments described herein.

In some embodiments and as shown in FIGS. 1-3, the apparatus 100 may comprise a reservoir container 11 having a base 12 with a sidewall 13 coupled to and extending away from the base 12. A reservoir cavity 14 (FIGS. 8 and 9) disposed within the reservoir container 11 may be formed and bounded by the sidewall 13 and base 12. A support lid 31 may be configured to extend over and cover all or portions of the reservoir cavity 14. One or more receptacles 51 (FIGS. 4-7) may be disposed within the support lid 31, and each receptacle 51 may be in fluid communication with the reservoir cavity 14. A pump 83 (FIGS. 6 and 19) may be in fluid communication with the reservoir cavity 14 and each receptacle 51. A processing unit 91 may be in electrical communication with the pump 83 and be configured to activate and control the pump 83. Optionally, the apparatus 100 may further comprise one or more plant containers 61 and each plant container 61 may be removably coupled within each receptacle 51. The plant containers 61 may have a chamber 62 which may include one or more water apertures 63, and the water apertures 63 may provide fluid communication between the chamber 62 and a receptacle 51.

Figure 8:
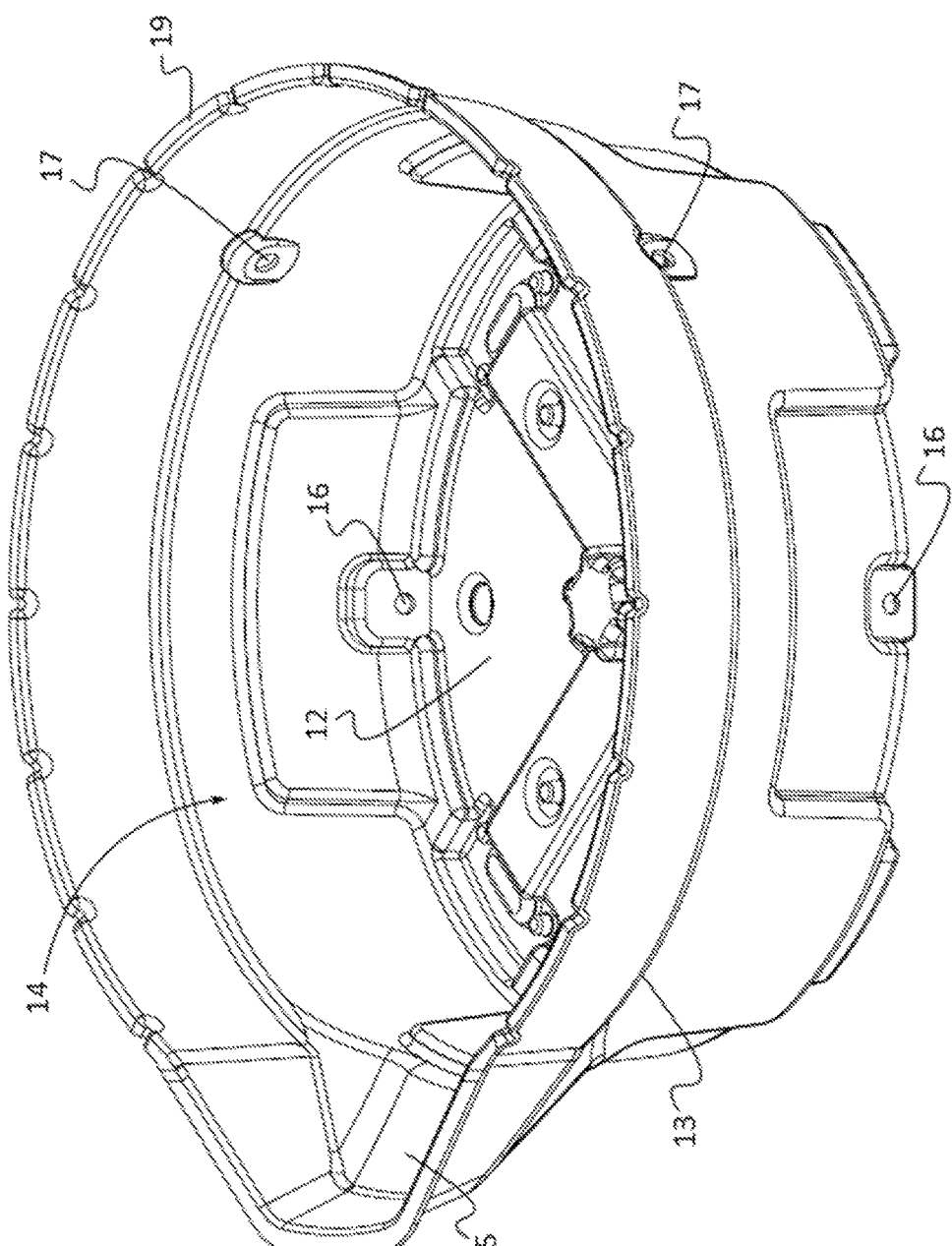
FIG. 8 illustrates a top perspective view of an example of a reservoir container according to various embodiments described herein.
Figure 9:
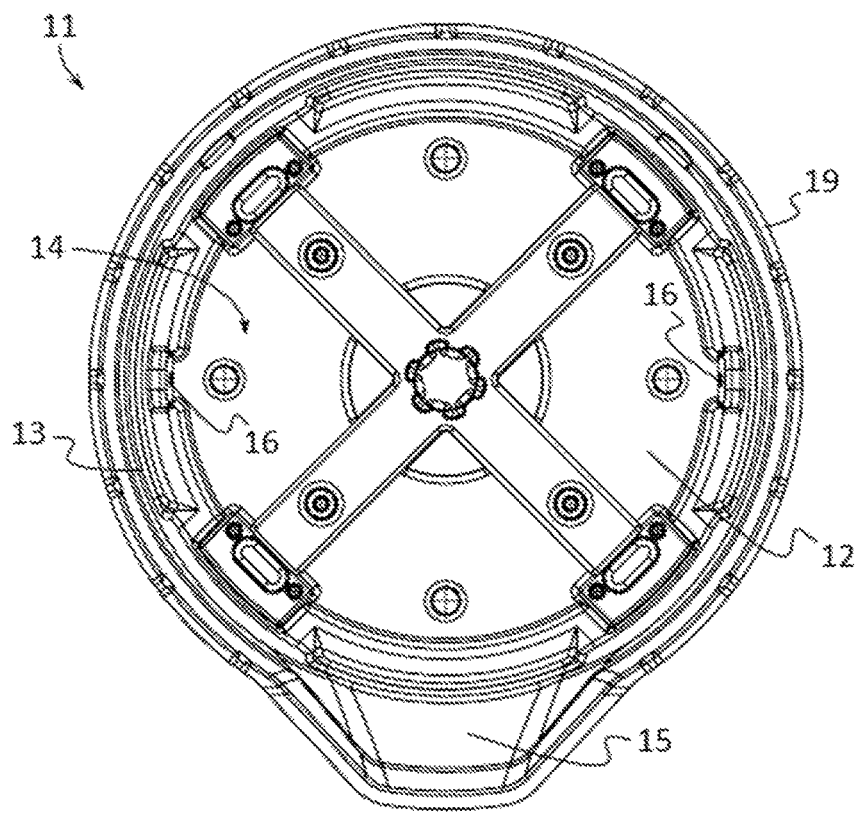
FIG. 9 shows a top plan view of an example of a reservoir container according to various embodiments described herein.
Figure 10:
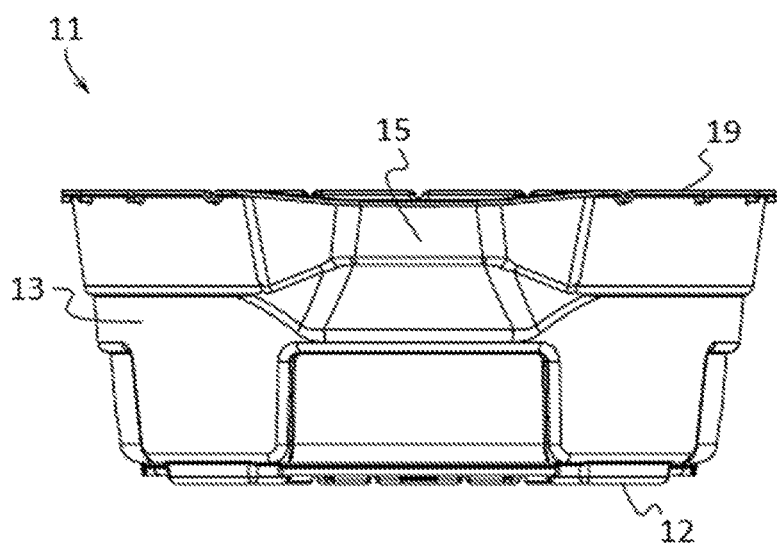
FIG. 10 depicts a front elevation view of an example of a reservoir container according to various embodiments described herein.
Figure 11:
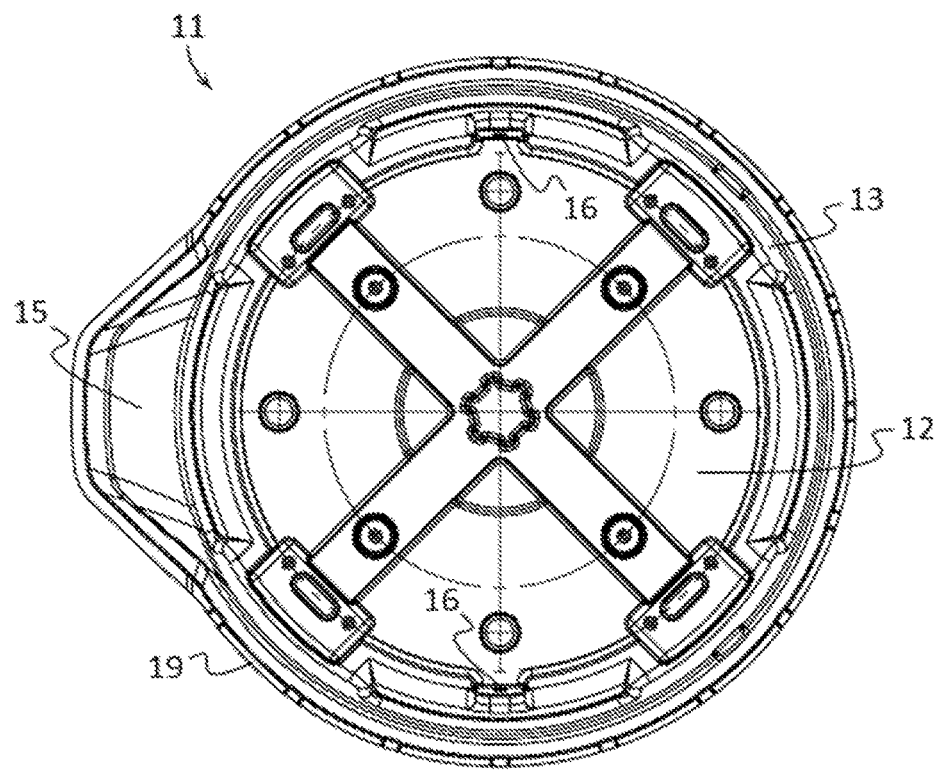
FIG. 11 illustrates a bottom plan view of an example of a reservoir container according to various embodiments described herein.
Figure 12:
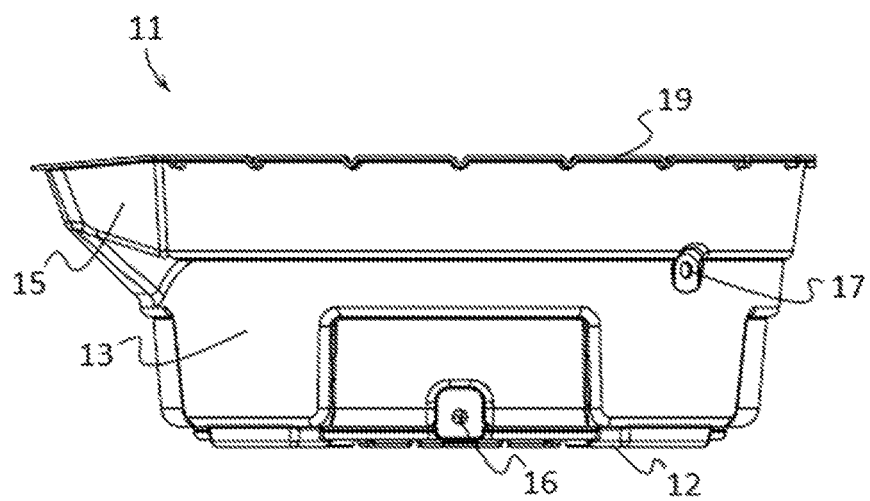
FIG. 12 shows a side elevation view of an example of a reservoir container according to various embodiments described herein.

FIGS. 4-7 depict an example of a support lid 31 according to various embodiments described herein. A support lid 31 may be sized and shaped to be engaged to and cover all or portions of the reservoir cavity 14 (FIGS. 8 and 9) of the reservoir container 11 (FIGS. 1-3, 8-12). The support lid 13 may comprise one or more receptacles 51 which may be disposed or formed into the support lid 31. Preferably each receptacle 51 may comprise one or more receptacle apertures 52 (FIG. 6) which may be configured to enable fluid communication between a receptacle 51 and the reservoir cavity 14 (FIGS. 8 and 9).

In some embodiments, fluid communication between a receptacle 51 and the reservoir cavity 14 may be enabled by a pump 83 which may be configured to motivate water from the reservoir cavity 14, into intake tubing 32, through output tubing 33, and into each receptacle 51. Optionally, the output tubing 33 may be coupled to a tubing connector 37, such as a "T" connector nozzle or any other type of hose or tubing connector, which may be coupled to a receptacle aperture 52 of a receptacle 51 to allow water to be supplied into a receptacle 51. Alternatively, the output tubing 33 may be coupled directly to a receptacle aperture 52 of a receptacle 51. The intake tubing 32 may be of a sufficient length to extend into the reservoir cavity 14 when the support lid 31 is engaged to or covering portions of the reservoir cavity 14 of the reservoir container 11. intake tubing 32 and/or output tubing 33 may comprise any suitable rigid or flexible tubing which may be generally a long hollow cylinder used for moving water and may be made from metal and metal alloys such as brass, copper, and aluminum, plastics such as polytetrafluoroethylene (PTFE), polyethylene terephthalate (PET), high-density polyethylene (HDPE), polyvinyl chloride (PVC), polypropylene (PP), Polystyrene (PS), Polycarbonate (PC), natural and synthetic rubber, silicone, and/or any other suitable material for conveying water. In alternative embodiments, fluid communication between a receptacle 51 and the reservoir cavity 14 may be enabled by tubing that is molded or formed into the reservoir container 11 and/or support lid 31.

In some embodiments, the apparatus 100 may comprise a bulk filling aperture 34 which may be configured to allow water to pass through the support lid 31 and into the reservoir cavity 14 while the support lid 31 is engaged to or covering portions of the reservoir cavity 14 of the reservoir container 11. In this manner water may be added to the reservoir cavity 14 without requiring the support lid 31 to be removed from the reservoir container 11. Optionally, a bulk filling aperture 34 may be formed or disposed in the support lid 31. In further embodiments, the reservoir container 11 may comprise a filling extension 15 (FIGS. 1-3, 8-12) preferably formed into or by a sidewall 13. In further embodiments, when the support lid 31 is engaged to the reservoir container 11, the bulk filling aperture 34 and filling extension 15 maybe aligned so that water passing through the bulk filling aperture 34 may be directed into the reservoir cavity 14 by the filling extension 15.

In some embodiments, the support lid 31 may comprise a support lip 35 which may extend around all or portions of the support lid 31. Preferably, the support lip 35 may be complementary in shape to portions of the reservoir container 11, such as the sidewall 13 and/or upper perimeter 19 of the reservoir container 11, so that when the support lid 31 is engaged to or covering portions of the reservoir cavity 14 of the reservoir container 11, the support lid 31 may be supported over the reservoir cavity 14 by the sidewall 13 and/or upper perimeter 19 of the reservoir container 11 and the support lip 35 may optionally contact or otherwise engage the sidewall 13 and/or upper perimeter 19 to maintain the positioning of the support lid 31. In this manner, the support lid 31 may be removably coupled to the reservoir container 11. In further embodiments, portions of one or more receptacles 51 may contact portions of the base 12 of the reservoir container 11 within the reservoir cavity 14 to support the support lid 31 over the reservoir cavity 14. In still further embodiments, the support lid 31 may be removably coupled to the reservoir container 11 with one or more fasteners, a push-to-lock type connection method, a turn-to-lock type connection method 36 (FIGS. 1 and 3), slide-to-lock type connection method or any other suitable temporary connection method. In alternative embodiments, the support lid 31 may be coupled to the reservoir container 11 with adhesive, plastic welding, by being integrally formed or molded together, or any other suitable generally non-removable connection method.

As perhaps best shown in FIGS. 4-7, the support lid 31 may comprise one, two, three, four, five, six, seven, eight, or more, such as a plurality, of receptacles 51. Generally, a receptacle 51 may be formed into or otherwise coupled to the support lid 31 and may form a depression into which plants, soil, and other objects may be received. Optionally, a receptacle 51 may be configured with a cylindrical and/or conical shape although a receptacle may be configured in type of shape including combinations of shapes. In further embodiments, the apparatus 100 may comprise one or more moisture sensors 99B which may be coupled or otherwise disposed within one or more receptacles 51. In still further embodiments, the apparatus 100 may comprise one or more plant containers 61 (FIGS. 1, 13-18) which may be coupled or otherwise disposed within one or more receptacles 51. Optionally, one or more moisture sensors 99B may be disposed within a receptacle 51 by being positioned within or extending into a plant container 61 which is disposed within a receptacle 51. In further embodiments, a moisture sensor which is disposed in a receptacle 51 may extend into a plant container 61 which is disposed within the receptacle 51 by extending through a water aperture 63 of the plant container 61.

In some embodiments, the apparatus 100 may comprise a water gauge 18 (FIGS. 1 and 4) which may be configured to indicate the amount of water that is within the reservoir cavity 14. In preferred embodiments, a water gauge 18 may comprise a mechanical float which may extend into the reservoir cavity 14 and which may provide information on the level of the water within the reservoir cavity 14. For example, as the water level rises or drops within the reservoir cavity 14, the mechanical float may rise or drop with the water and move a level indicator which may indicate the amount of water that is within the reservoir cavity 14. In alternative embodiments, the water gauge 18 may comprise a liquid Level Sensor, such as a float Sensor, Capacitance Sensor, Conductivity Probes, Intelligent Overhead Tank Water Level Indicator, Ultrasonic Sensor, a Radar Level Sensor, Optical Sensors, or any other suitable type of mechanical indicator or electrical sensor which may be used to indicate the amount of water that is within the reservoir cavity 14.

FIGS. 8-12 depict an example of a reservoir container 11 according to various embodiments described herein. The reservoir container 11 may comprise one or more reservoir cavities 14 which may be fully or partially formed by one or more sidewalls 13 and/or a base 12. The size and shape of the sidewalls 13 and/or base 12 may be increased to increase the size and/or number of reservoir cavities 14 within the reservoir container 11, or the size and shape of the sidewalls 13 and/or base 12 may be decreased to decrease the size and/or number of reservoir cavities 14 within the reservoir container 11.

In some embodiments, a sidewall 13 and base 12 may be shaped to form a generally cylindrical reservoir container 11 and/or reservoir cavity 14. However, it should be understood to one of ordinary skill in the art that a base 12, sidewall 13, reservoir cavity 14, support lid 31, bulk filling aperture 34, receptacle 51, and/or plant container 61 may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

In some embodiments, the apparatus 100 may comprise a pressure filling coupling 16 positioned anywhere on the apparatus 100, such as on a sidewall 13, which may be configured to be coupled to a preferably pressurized source of water such as a garden hose, garden tubing, or other water conveyance. In further embodiments, a pressure filling coupling 16 may comprise a female threaded garden hose coupling which may be threadedly engaged to a threaded male garden hose coupling such as which may be found on a typical garden hose. When not in use, a threaded cap may be removably coupled to the pressure filling coupling 16 to prevent water from leaking or otherwise escaping from the pressure filling coupling 16. In alternative embodiments, a pressure filling coupling 16 may comprise a nipple type coupling, a push-to-lock type connection method, a turn-to-lock type connection method, slide-to-lock type connection method or any other suitable temporary connection method which may enable a water conveyance to be removably coupled to the pressure filling coupling 16 so that water may be supplied through the water conveyance and into the reservoir cavity 14.

In alternative embodiments, a pressure filling coupling 16 may allow a water conveyance to be substantially permanently coupled in fluid communication with the reservoir cavity 14. In still further alternative embodiments, a pressure filling coupling 16 may be connected to a gravity feed water conveyance such as a cistern or the reservoir cavity 14 of one or more other apparatuses 100. For example, the pressure filling couplings 16 of two or more apparatuses 100 may be coupled together with one or more water conveyances thereby allowing water transferred into one apparatus 100 to also be communicated to the other apparatuses 100.

In some embodiments, the apparatus 100 may comprise an overflow aperture 17 positioned anywhere on the apparatus 100, such as on a sidewall 13, which may be configured to allow water within the reservoir cavity 14 that is in contact with the overflow aperture 17 to exit the reservoir cavity 14 through the overflow aperture 17. An overflow aperture 17 may comprise a hole or opening which may provide a path for excess water, such as from rain and precipitation to exit the reservoir cavity 14 in a desired direction or manner. In preferred embodiments, an overflow aperture 17 may be positioned in proximity to the upper perimeter 19 of the reservoir container 11. In further embodiments, an overflow aperture 17 may comprise a hose coupling, such as a female threaded hose coupling which may be used to removably couple a hose with a male threaded coupling, or tubing which may be used to direct water exiting the reservoir cavity 14 through the overflow aperture 17.

Figure 13:
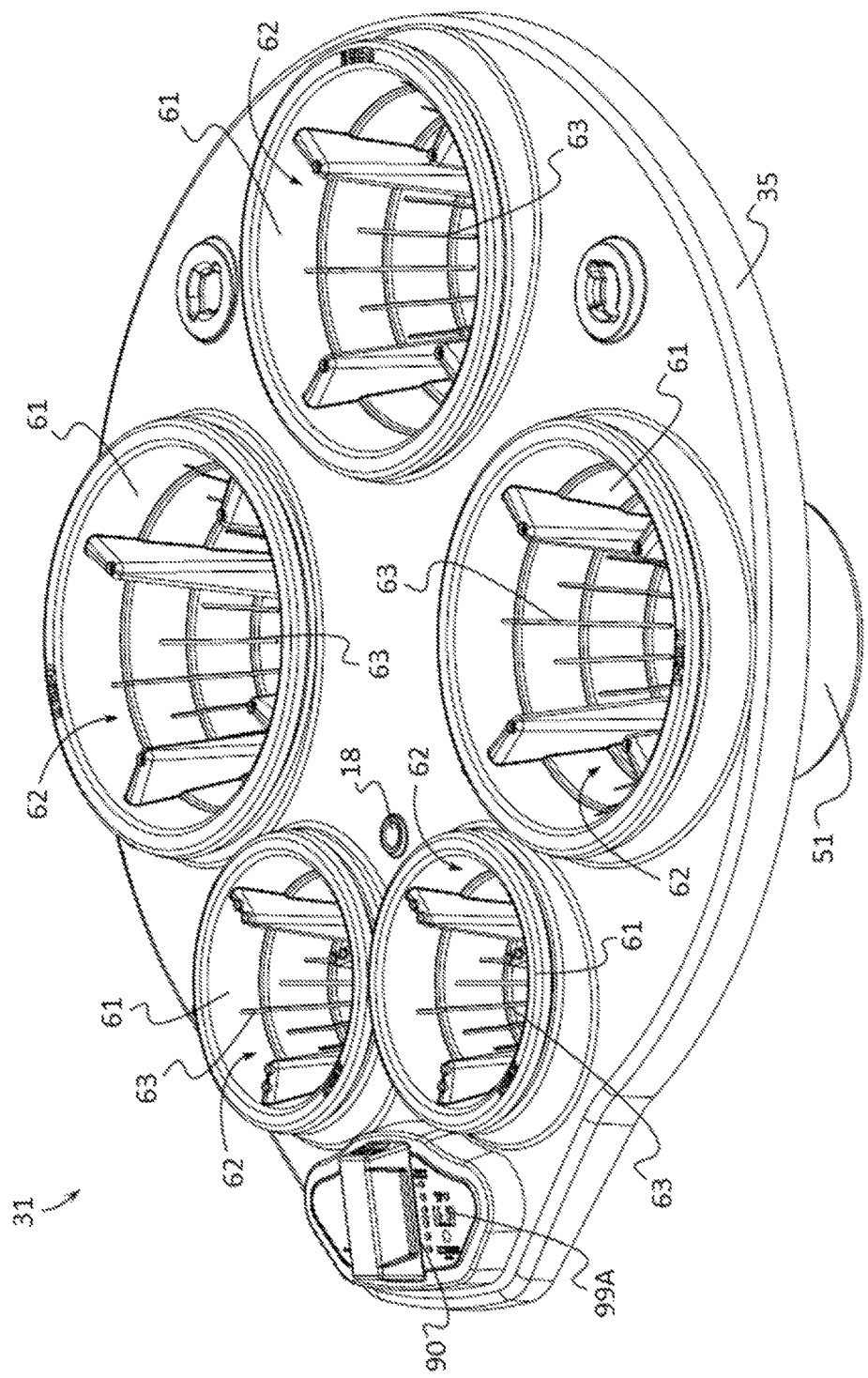
FIG. 13 depicts a top perspective view of an example of a support lid with a plant container removably coupled within the receptacles of the support lid according to various embodiments described herein.

FIG. 13 depicts a top perspective view of an example of a support lid 31 with a plant container 61 removably coupled within the receptacles 51 of the support lid 31 according to various embodiments described herein. FIGS. 14-17 show an example of a plant container 61 according to various embodiments described herein. One or more plant containers 61 may be coupled within a receptacle 51 and soil, other matter, and/or plants may be disposed within a chamber 62 of a plant container 61. In this manner, a plant container 61 may serve as a removable liner for a receptacle 51 to allow the soil, other matter, and/or plants within the plant container 61 to be easily removed from the receptacle 51 by removing the plant container 61 from the receptacle 51.

In some embodiments, a plant container 61 may be removably coupled within a receptacle 51, by simply placing the plant container 61 within the receptacle 51 so that the plant container 61 is maintained in the receptacle 51 by the action of gravity. In alternative embodiments, a plant container 61 may be removably coupled within a receptacle 51, by one or more fasteners, a push-to-lock type connection method, a turn-to-lock type connection method, slide-to-lock type connection method or any other suitable temporary connection method. In further alternative embodiments, a plant container 61 may be substantially permanently coupled to a receptacle 51 and/or to the support lid 31 with adhesive, welding, by being integrally formed or molded together, or any other substantially permanent method.

As perhaps best shown in FIGS. 13-17, a plant container 61 may comprise one, two, three, four, five, six, seven, eight, nine, ten or more, such as a plurality, of water apertures 63 which are configured to allow water to pass into and out of the chamber 62. When a plant container 61 is disposed or coupled within a receptacle 51, a water aperture 63 may provide fluid communication between the chamber 62 and the receptacle 51. In this manner, fluid communication between the reservoir cavity 14 (FIGS. 8 and 9) and the chamber 62 of a plant container 61 may be provided by a receptacle aperture 52, which allows fluid communication between a reservoir cavity 14 and a receptacle 51, and a water aperture 63, which allows fluid communication between the receptacle 51 the chamber 62 of the plant container 61 disposed within the receptacle 51.

Figure 14:
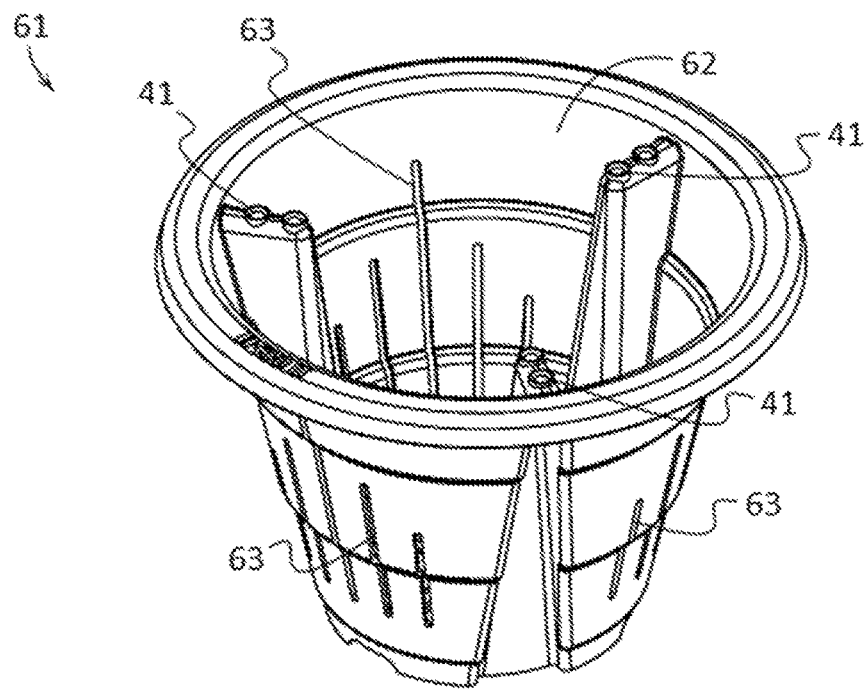
FIG. 14 illustrates a top perspective view of an example of a plant container according to various embodiments described herein.
Figure 15:
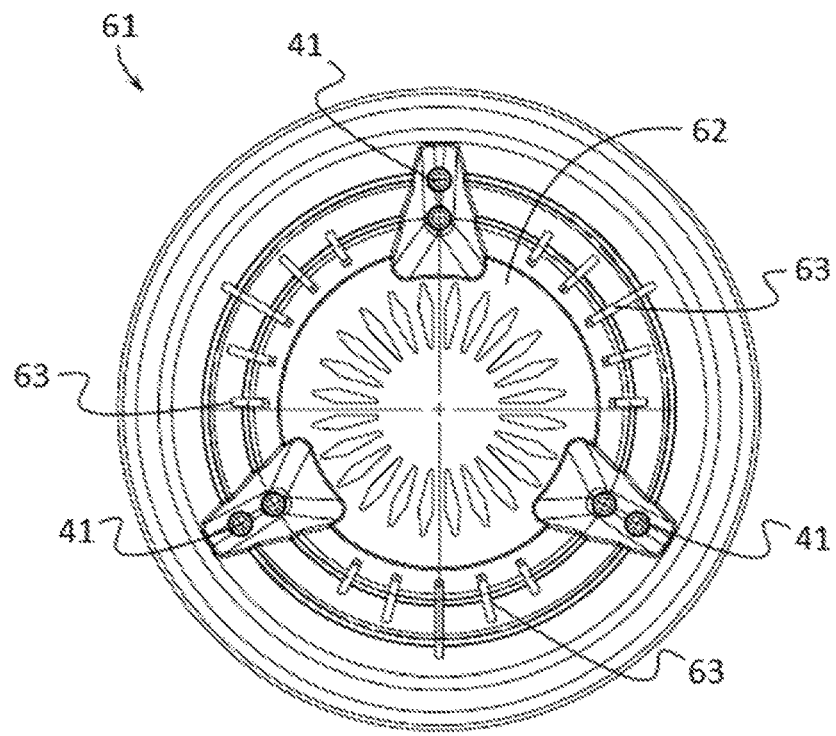
FIG. 15 shows a top plan view of an example of a plant container according to various embodiments described herein.
Figure 16:
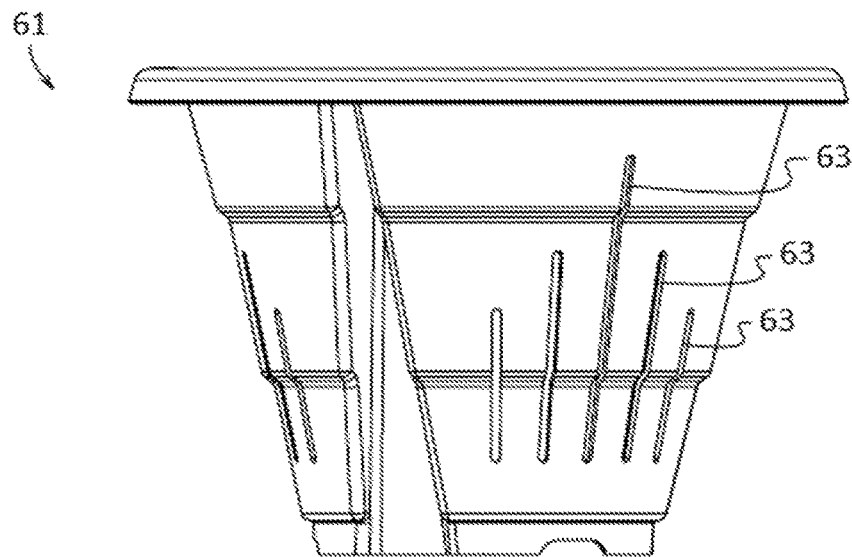
FIG. 16 depicts a side elevation view of an example of a plant container according to various embodiments described herein.
Figure 17:
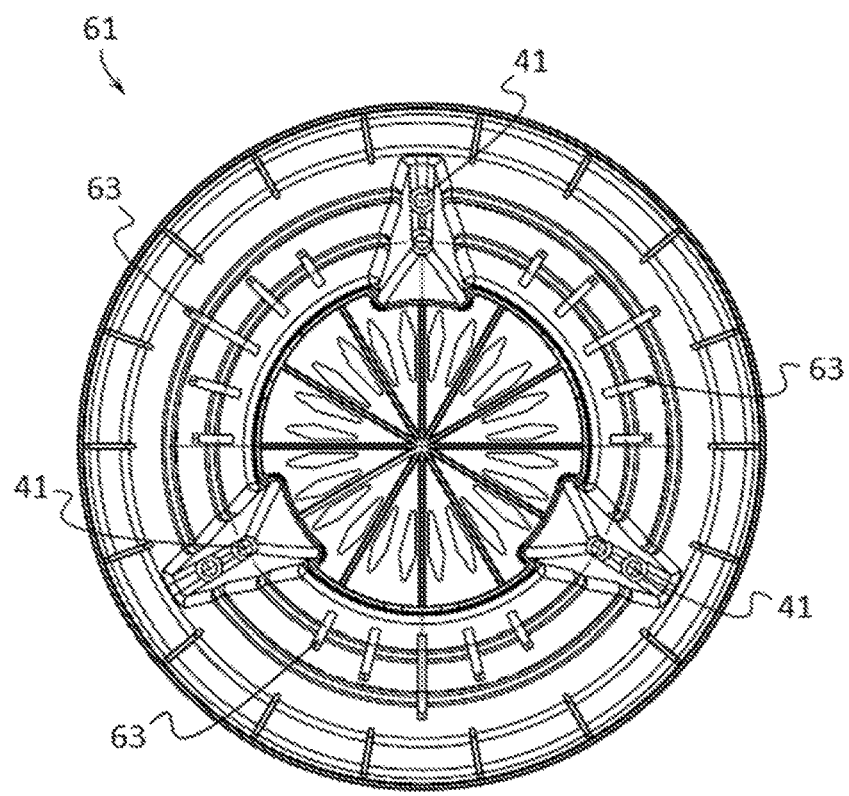
FIG. 17 illustrates a bottom plan view of an example of a plant container according to various embodiments described herein.
Figure 18:
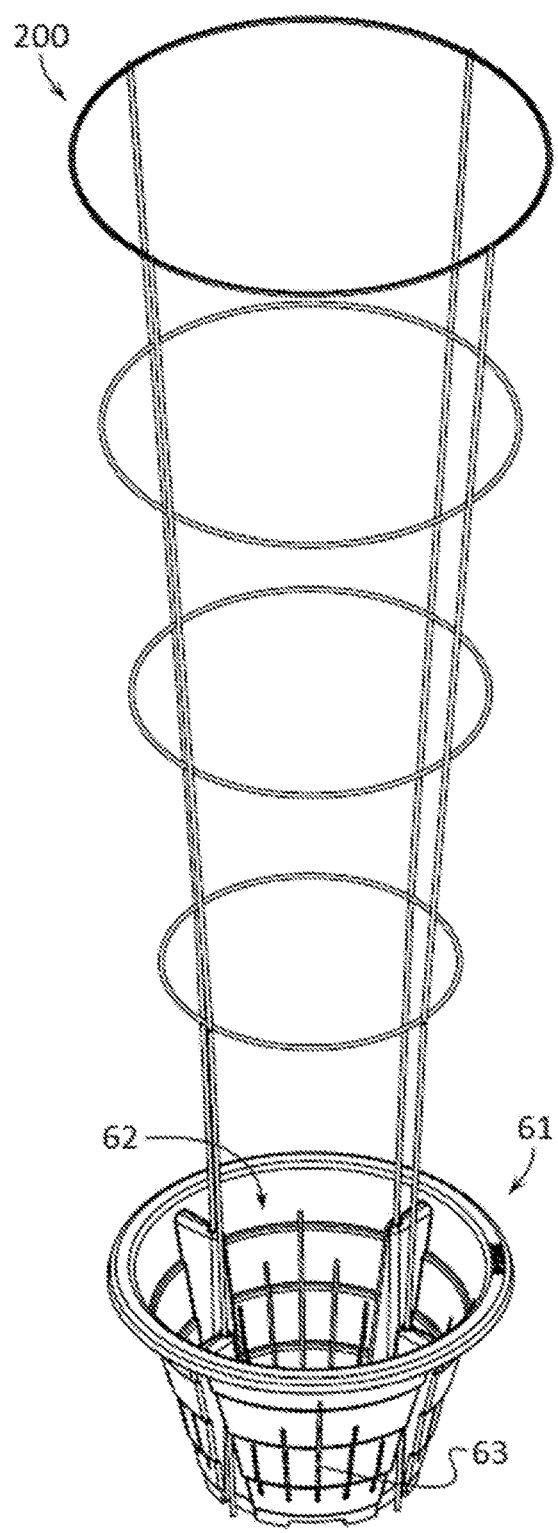
FIG. 18 shows a top perspective view of an example of a plant container with a plant support structure according to various embodiments described herein.

Referring now to FIGS. 14, 15, and 18, in some embodiments the apparatus 100 may comprise one or more structure support apertures 41 which may be positioned anywhere on the apparatus 100 such as on a plant container 61. Structure support apertures 41 may be shaped and spaced to receive portions of plant support structures 200 which may be used to support and/or guide the growth of plants within the receptacles 51 and/or plant containers 61 of the apparatus 100. As shown in the example of FIG. 18, a plant support structure 200 may comprise a tomato cage and portions of the plant support structure 200 may be inserted into or otherwise coupled to one or more structure support apertures 41. In further embodiments, a structure support aperture 41 may be shaped and sized to receive or couple a plant support structure 200 such as a trellis, pole, fencing, netting, or any other structure which may be used to support and/or guide the growth of plants.

Figure 19:
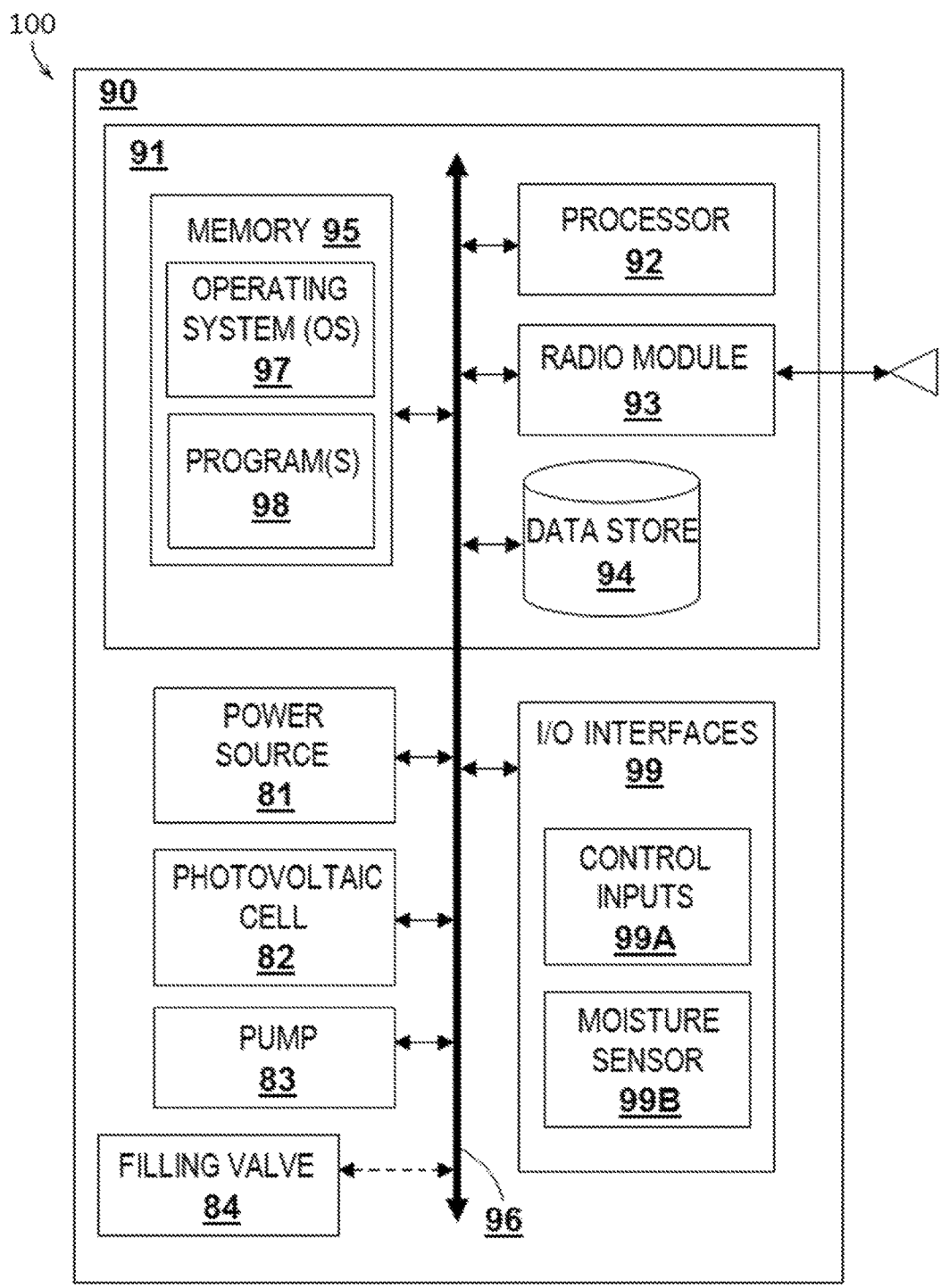
FIG. 19 depicts a block diagram showing some components of an example of an automated garden apparatus according to various embodiments described herein.

FIG. 19 depicts a block diagram showing some components of an example of an automated garden apparatus 100 according to various embodiments described herein. In some embodiments, the apparatus 100 may comprise an electronics module 90 which may house one or more electronic components such as a processing unit 91. An electronics module 90 may be positioned anywhere on the apparatus 100. In further embodiments, and as shown in FIGS. 1, 2, and 13, an electronic module 90 may be removably coupled within or to the bulk filling aperture 34 thereby allowing the electronic module 90 to function as a lid or covering for the bulk filling aperture 34.

In some embodiments and in the present example, the apparatus 100 can be a digital device that, in terms of hardware architecture, optionally comprises processing unit with a processor 92, a radio module 93, a data store 94, and memory 95. Additionally, the apparatus 100 may optionally comprise one or more input/output (I/O) interfaces 99, power sources 81, and/or photovoltaic cells 82. It should be appreciated by those of ordinary skill in the art that FIG. 19 depicts an example of the apparatus 100 in an oversimplified manner, and a practical embodiment may include additional components or elements and suitably configured processing logic to support known or conventional operating features that are not described in detail herein.

The components and elements (99, 92, 93, 94, 95, 81, and 82) are communicatively coupled via a local interface 96. The local interface 96 can be, for example but not limited to, one or more buses or other wired or wireless connections, as is known in the art. The local interface 96 can have additional elements, which are omitted for simplicity, such as controllers, buffers (caches), drivers, repeaters, and receivers, among many others, to enable communications. Further, the local interface 96 may include address, control, and/or data connections to enable appropriate communications among the aforementioned components.

In preferred embodiments, a local interface 96 may be an integrated circuit (IC) that integrates one or more components (99, 92, 93, 94, and 95) on a single chip sometimes called a system on a chip (SoC) or system on chip (SOC). In further preferred embodiments, a local interface 96 and one or more components (99, 92, 93, 94, and 95) may be a microcontroller (or MCU, short for microcontroller unit) which may be a small computer (SoC) on a single integrated circuit containing a processor 92, memory 95, and programmable input/output interfaces or peripherals 99. Program memory in the form of Ferroelectric RAM, NOR flash or OTP ROM is also often included on chip, as well as a typically small amount of RAM. Microcontrollers are designed for embedded applications, in contrast to the microprocessors used in personal computers or other general purpose applications consisting of various discrete chips. Microcontrollers are used in automatically controlled products and devices, such as automobile engine control systems, implantable medical devices, remote controls, office machines, appliances, power tools, toys and other embedded systems. By reducing the size and cost compared to a design that uses a separate microprocessor, memory, and input/output devices, microcontrollers make it economical to digitally control even more devices and processes. Mixed signal microcontrollers are common, integrating analog components needed to control non-digital electronic systems.

In alternative embodiments, a local interface 96 may comprise a printed circuit board (PCB) which mechanically supports and electrically connects electronic components including MCU's using conductive tracks, pads and other features etched from copper sheets laminated onto a non-conductive substrate. PCBs can be single sided (one copper layer), double sided (two copper layers) or multi-layer. Conductors on different layers may be connected with plated-through holes called vias. In further embodiments, a control board 96 may comprise a printed circuit assembly (PCA), printed circuit board assembly or PCB assembly (PCBA), a circuit card assembly (CCA), or a backplane assembly, or any other suitable electrical connection and communication method including standard wiring and the like.

The processor 92 is a hardware device for executing software instructions. The processor 92 can be any custom made or commercially available processor, a central processing unit (CPU), an auxiliary processor among several processors, a semiconductor-based microprocessor (in the form of a microchip or chip set), or generally any device for executing software instructions. When in operation, the processor 92 is configured to execute software stored within the memory 95, to communicate data to and from the memory 95, and to generally control operations of the device 100 pursuant to the software instructions. In an exemplary embodiment, the processor 92 may include a mobile optimized processor such as optimized for power consumption and mobile applications.

The I/O interfaces 99 can be used to input and/or output information and power. The I/O interfaces 99 can also include, for example, a serial port, a parallel port, a small computer system interface (SCSI), an infrared (IR) interface, a radio frequency (RF) interface, a universal serial bus (USB) interface, and the like.

In some embodiments, I/O interfaces 99 may include one or more control inputs 99A which may comprise turnable control knobs, depressible button type switches, a key pad, slide type switches, dip switches, rocker type switches, rotary dial switches, numeric input switches or any other suitable input which a user may interact with to provide input. In further embodiments, control inputs 99A may include one or more light emitting elements or other display devices, e.g., a display screen, light emitting diodes (LEDs), a speaker, or any other suitable device for outputting or displaying information. The I/O interfaces 99 can also include, for example, a serial port, a parallel port, a small computer system interface (SCSI), an infrared (IR) interface, a radio frequency (RF) interface, a universal serial bus (USB) interface, and the like.

In some embodiments, the apparatus 100 may optionally comprise one or more I/O interfaces 99 which may be a moisture sensor 99B. A moisture sensor 99B may be configured to provide moisture data which may be used by the processing unit 91 for activation of the pump 83 when the moisture sensor 99B detects moisture at, below, or above a moisture threshold. A moisture sensor may be configured to measure the moisture level of soil in one or more receptacles 51 and/or plant containers 61. For example, when the moisture sensor 99B detects a level of moisture, such as in an amount of soil in a receptacle 51 and/or plant container 61, below a certain threshold, the processor 92 may activate the pump 83 motivate water from the reservoir cavity 14 (FIGS. 8 and 9) into one or more receptacles 51 and/or plant containers 61. In another example, when the moisture sensor 99B detects a level of moisture, such as in an amount of soil in a receptacle 51 and/or plant container 61, at a certain threshold, the processor 92 may deactivate the pump 83. Optionally, excess water from the receptacle 51 and/or plant container 61 may drain or exit the receptacle 51 and/or plant container 61 through the assistance of gravity by way of receptacle apertures 52 and/or water apertures 63. In a further example, when the moisture sensor 99B detects a level of moisture, such as in an amount of soil in a receptacle 51 and/or plant container 61, above a certain threshold, the processor 92 may activate the pump 83, such as in reverse, to motivate water from one or more receptacles 51 and/or plant containers 61 into the reservoir cavity 14 (FIGS. 8 and 9).

A moisture sensor 99B may comprise a Frequency Domain Reflectometry (FDR) type of sensor, a Time Domain Transmission (TDT) and/or Time Domain Reflectometry (TDR) type of sensor, a Neutron moisture gauge type of sensor, a Soil resistivity type of sensor, a Galvanic cell type of sensor, or any other type of moisture sensor configured to electrically communicate moisture information.

In further embodiments, the apparatus 100 may comprise two or more pumps 83 and each pump 83 may be in fluid communication with the reservoir cavity 14 (FIGS. 8 and 9) and one or more receptacles 51 (FIGS. 4-7). Optionally, the apparatus 100 may comprise one or more plant containers 61 (FIGS. 1-3, and 13-18) disposed within one or more of the receptacles 51. When a plant container 61 is disposed or coupled within a receptacle 51, a water aperture 63 may provide fluid communication between the chamber 62 of a plant container and a receptacle 51. The apparatus 100 may also include two or more moisture sensors 99B and the processing unit 91 may be in electrical communication with the moisture sensors 99B and the pumps 83. Each moisture sensor 99B may be configured to measure the moisture level of soil in one or more receptacles 51 and/or plant containers 61. The processing unit 91 may activate one or more pumps 83 when one or more moisture sensors 99B detects moisture in one or more receptacles 51 and/or plant containers 61 to be below a moisture threshold.

For example, the apparatus 100 may comprise one or more relatively larger sized receptacles 51 and/or plant containers 61 in addition to one or more relatively smaller sized receptacles 51 and/or plant containers 61. The apparatus 100 may further include one or more moisture sensors 99B configured to measure the moisture of soil within one or more of the larger sized receptacles 51 and/or plant containers 61 and one or more moisture sensors 99B configured to measure the moisture of soil within one or more of the smaller sized receptacles 51 and/or plant containers 61. The apparatus 100 may also include one or more pumps 83 configured to communicate water between the reservoir cavity 14 and one or more of the larger sized receptacles 51 and/or plant containers 61 and one or more pumps 83 configured to communicate water between the reservoir cavity 14 and one or more of the smaller sized receptacles 51 and/or plant containers 61. The processing unit 91 may be in electrical communication with the moisture sensors 99B and the pumps 83. Each moisture sensor 99B may be configured to measure the moisture level of soil in one or more receptacles 51 and/or plant containers 61. When one or more moisture sensors 99B detects moisture in one or more larger sized receptacles 51 and/or plant containers 61 to be below a moisture threshold, the processing unit 91 may activate one or more pumps 83 in fluid communication with the larger sized receptacles 51 and/or plant containers 61 to communicate water into the respective larger sized receptacles 51 and/or plant containers 61. Similarly, when one or more moisture sensors 99B detects moisture in one or more smaller sized receptacles 51 and/or plant containers 61 to be below a moisture threshold, the processing unit 91 may activate one or more pumps 83 in fluid communication with the smaller sized receptacles 51 and/or plant containers 61 to communicate water into the respective smaller sized receptacles 51 and/or plant containers 61.

An optional radio module 93 may enable wireless communication to an external access device or network through an antenna. A radio module 93 may comprise a wireless communication receiver and optionally a wireless communication transmitter. In some embodiments, a radio module 93 may operate on a cellular band and may communicate with or receive a Subscriber Identity Module (SIM) card or other wireless network identifier. Any number of suitable wireless data communication protocols, techniques, or methodologies can be supported by the radio module 93, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 94 may be used to store data. The data store 94 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 94 may incorporate electronic, magnetic, optical, and/or other types of storage media.

The memory 95 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 95 may incorporate electronic, magnetic, optical, and/or other types of storage media. Note that the memory 95 may have a distributed architecture, where various components are situated remotely from one another, but can be accessed by the processor 92. The software in memory 95 can include one or more software programs, each of which includes an ordered listing of executable instructions for implementing logical functions. In the example of FIG. 19, the software in the memory 95 may include a suitable operating system (O/S) 97 and programs 98. An operating system 97 essentially controls the execution of input/output interface 99 functions, and provides scheduling, input-output control, file and data management, memory management, and communication control and related services.

The operating system 97 may be, for example, LINUX (or another UNIX variant) and any Linux-kernel-based operating systems, Raspbian, Ubuntu, OpenELEC, RISC OS, Arch Linux ARM, OSMC (formerly Raspbmc) and the Kodi open source digital media center, Pidora (Fedora Remix), Puppy Linux, Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like. The programs 98 may include various applications, add-ons, etc. configured to provide end user functionality.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The apparatus 100 may optionally include a main memory, such as a random access memory (RAM) or other dynamic storage device (e.g., dynamic RAM (DRAM), static RAM (SRAM), and synchronous DRAM (SDRAM)), coupled to the control board 96 for storing information and instructions, sometimes called "firmware" that is written in codes such as "assembly", "C" and "Basic", to be executed by the processor 92. In addition, the main memory may be used for storing temporary variables or other intermediate information during the execution of instructions by the processor 92. The apparatus 100 may further optionally include a read only memory (ROM) or other static storage device (e.g., programmable ROM (PROM), erasable PROM (EPROM), and electrically erasable PROM (EEPROM)) coupled to the control board 96 for storing static information and instructions for the processor 92.

In some embodiments, the apparatus 100 may optionally comprise a power source 81 which may provide electrical power to any component (99, 99A, 99B, 92, 93, 94, 95) of the apparatus 100 that may require electrical power. A power source 81 may comprise a battery, such as a lithium ion battery, nickel cadmium battery, alkaline battery, or any other suitable type of battery, a fuel cell, a capacitor, a super capacitor or any other type of energy storing and/or electricity releasing device. In further embodiments, a power source 81 may comprise a power cord, kinetic or piezo electric battery charging device, and/or inductive charging or wireless power receiver. In alternative embodiments, electrical power may be supplied to any component (99, 99A, 99B, 92, 93, 94, 95) of the apparatus 100 that may require electrical power through a wired connection to a power source.

In some embodiments, a power source 81 may optionally comprise one or more photovoltaic cells 82, such as a photovoltaic array, which may be configured to provide power to a power source 81 such as via a local interface 96. A photovoltaic cell 82 may comprise any electrical device, such as a solar cell, that converts the energy of light directly into electricity by the photovoltaic effect, such as Crystalline silicon photovoltaic cells, Thin Film photovoltaic cells, Multi junction photovoltaic cells, Perovskite solar cells, Liquid inks, Quantum dot solar cells, Dye-sensitized solar cells, Photon upconversion and downconversion solar cells, Organic/polymer solar cells, Adaptive solar cells, and/or any other type of cell which converts the energy of light into electricity using the photovoltaic effect.

In some embodiments, the apparatus 100 may comprise a filling valve 84 which may be configured to govern the communication of water into the reservoir cavity 14 (FIGS. 8 and 9) such as through a pressure filling coupling 16. In further embodiments, the filling valve 84 may be a mechanical valve and as such may be operated by the movement of a float or other physical water gauge configured to detect the water level within a reservoir cavity 14. In alternative embodiments, the filling valve 84 may be an electrically operated valve and may be in electrical communication with the processing unit 91 which may control the functioning of the filling valve 84 via the local interface 96. For example, the filling valve 84 may be a solenoid-operated valve which may open when provided electricity by the processing unit 91 and close when the electric current fails. A filling valve 84 may comprise any type of electrically and/or mechanically operated valve such as a hydraulic type valve, pneumatic type valve, manual type valve, solenoid type valve, and motor type valve.

While some materials have been provided, in other embodiments, the elements that comprise the apparatus 100 such as the reservoir container 11, support lid 31, electronics module 90, receptacles 51, optional plant containers 61, and/or any other element discussed herein may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the apparatus 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the apparatus 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the apparatus 100 may be coupled by being one of connected to and integrally formed with another element of the apparatus 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An automated planter apparatus for growing plants, the apparatus comprising:
   a reservoir container having a base with a sidewall coupled to and extending away from and encircling said base;
   a reservoir cavity formed by the sidewall and base disposed within the reservoir container;
   a support lid extending completely over and encircling the reservoir cavity so that the support lid contacts an upper surface of the entire sidewall;
   a bulk filling aperture disposed within a peripheral edge of the support lid, wherein the bulk filling aperture is in fluid communication with the reservoir cavity;
   a pump for motivating water into a receptacle;
   an electronics module comprising a processing unit, wherein the processing unit is in electrical communication with the pump and wherein the electronics module is removably coupled to the support lid above the bulk filling aperture thereby forming a lid for the bulk filling aperture; and a filling extension formed by a portion of the sidewall of the reservoir container, the filling extension aligned below the bulk filling aperture and the electronic module and the filling extension protruding outwardly at an angle away from the reservoir container sidewall so that water passing through the bulk filling aperture may be directed into the reservoir cavity.

2. The apparatus of claim 1, further comprising a moisture sensor disposed within the receptacle, wherein the moisture sensor is in electrical communication with the processing unit, and wherein the processing unit activates the pump when the moisture sensor detects moisture below a moisture threshold.

3. The apparatus of claim 1, further comprising a water gauge wherein the water gauge indicates an amount of water within the reservoir cavity.

4. The apparatus of claim 1, further comprising a plant container having a chamber with a water aperture, wherein the plant container is removably coupled within the receptacle, and wherein the water aperture provides fluid communication between the chamber and the receptacle.

5. The apparatus of claim 1, further comprising a pressure filling coupling coupled to the base of the reservoir container below the support lid, the pressure filling coupling configured to govern communication of water into reservoir cavity.

6. The apparatus of claim 1, further comprising an overflow aperture, wherein the overflow aperture allows water within the reservoir cavity that is in contact with the overflow aperture to exit the reservoir cavity through the overflow aperture.

7. The apparatus of claim 1, further comprising a power source wherein the power source provides electrical power to a lithium ion battery and the lithium ion battery provides power to the processing unit.

8. The apparatus of claim 7, wherein the power source comprises a photovoltaic cell.

\* \* \* \* \*